April 5, 1932. M. E. KING 1,852,974
DIFFERENTIAL DRIVE MECHANISM FOR AUTOMOBILES
Filed Jan. 19, 1929 2 Sheets-Sheet 1
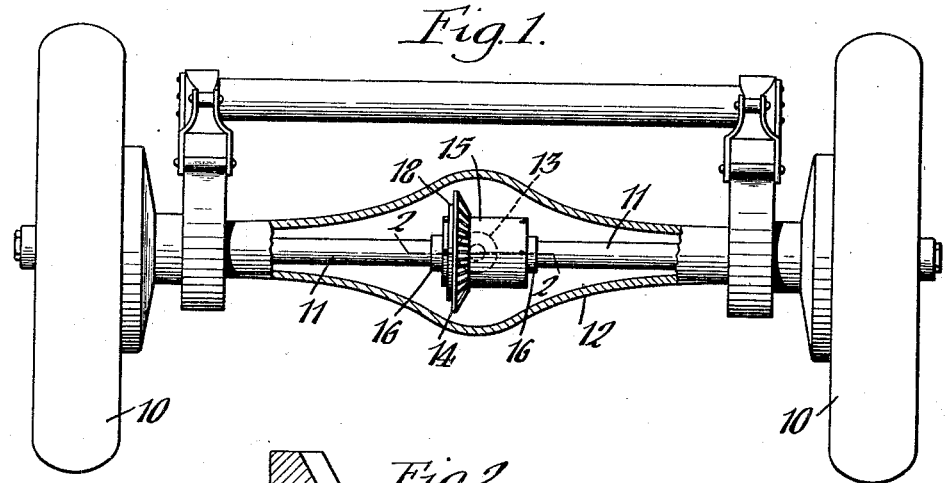
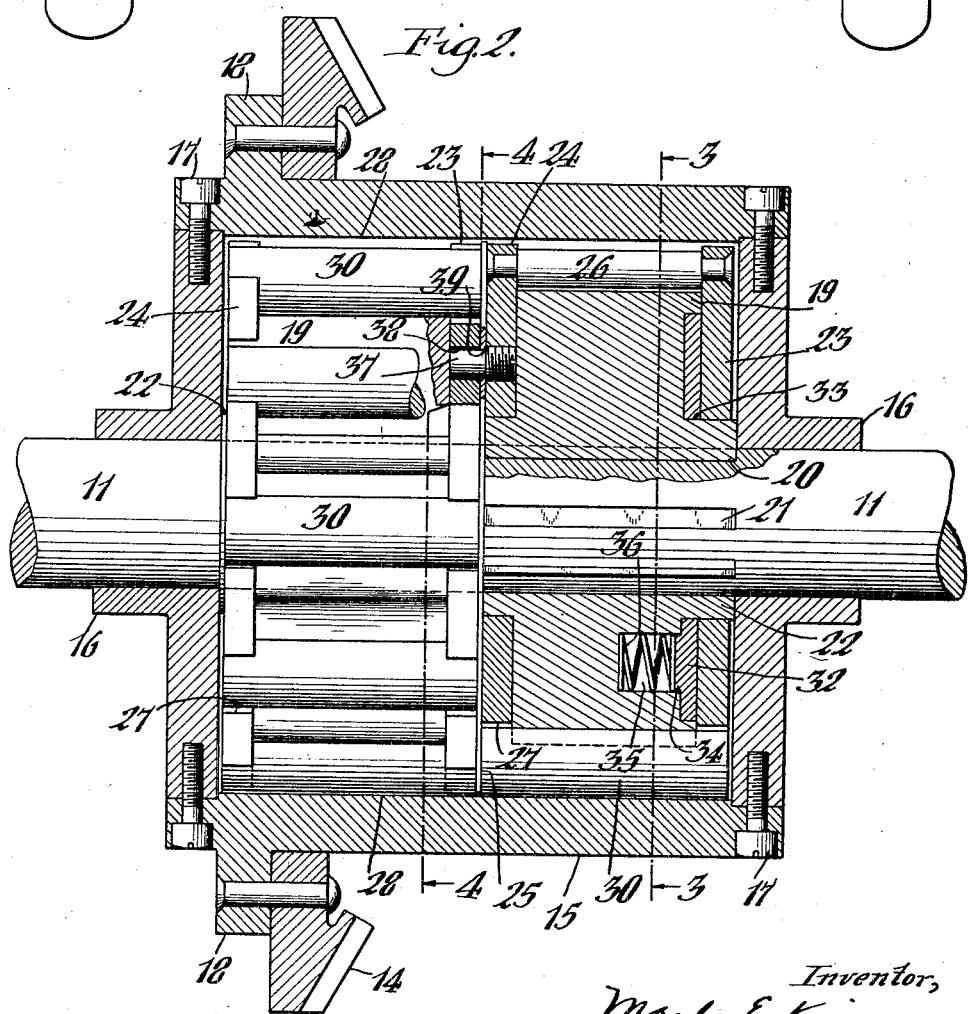
Inventor,
Manly E. King,
by Walter P. Geyer
Attorney.

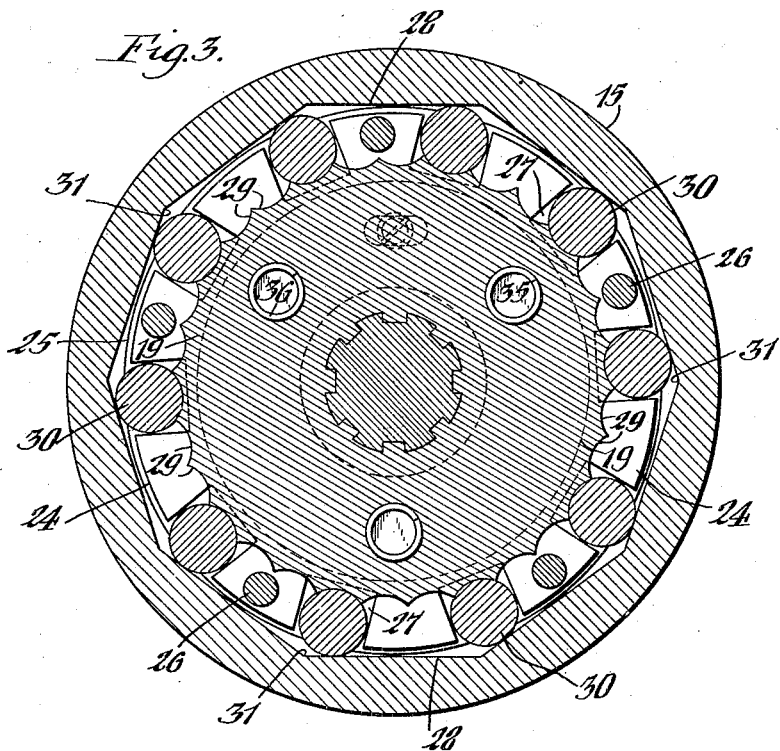
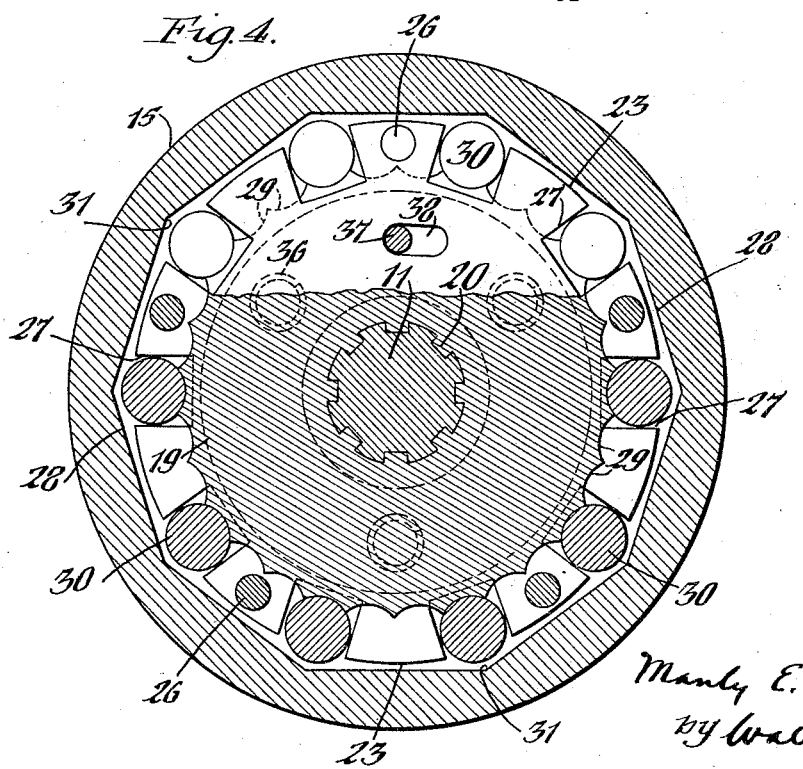

Patented Apr. 5, 1932

1,852,974

UNITED STATES PATENT OFFICE

MANLY E. KING, OF SPRINGVILLE, NEW YORK

DIFFERENTIAL DRIVE MECHANISM FOR AUTOMOBILES

Application filed January 19, 1929. Serial No. 333,674.

This invention relates to improvements in a differential drive mechanism for automobiles.

One of its objects is the provision of an effective and reliable mechanism of this character which will provide a positive drive forward or backward to both rear driving wheels of the car and which will at the same time permit the differential action required when turning corners and the relative movement of the axle-sections in accordance with the resistance offered to the traction wheels.

Another object of the invention is to provide a gearless differential drive mechanism which is simple, inexpensive and durable in construction, which is not liable to get out of order, and which can be readily applied to the axles and housings of existing vehicles without in any way altering their construction.

Other features of the invention reside in the combination and arrangement of elements hereinafter described and particularly pointed out in the appended claims.

In the accompanying drawings:—

Figure 1 is a sectional rear view of an automobile chassis showing my improved differential drive mechanism applied thereto. Figure 2 is an enlarged longitudinal section taken on line 2—2, Figure 1. Figure 3 is a transverse section taken on line 3—3, Figure 2, showing the drive rollers in their gripping position for transmitting power to the axle. Figure 4 is a transverse section on line 4—4, Figure 2, showing the drive rollers in their neutral or non-gripping position for effecting the differential action.

Similar characters of reference indicate corresponding parts throughout the several views.

By way of example, the invention has been shown in connection with the rear axle of a motor vehicle, 10 indicating the traction wheels, 11 their corresponding alined axle-sections, 12 the usual housing therefor and 13 the propeller shaft pinion which engages the ring gear 14 of the differential assembly.

The opposing inner ends of the axle-sections are enclosed within a sleeve-like drive casing 15 closed at its ends by cover plates 16 fastened thereto by radial screws 17 or other equivalent means. The ring gear 14 is riveted or otherwise secured to an attaching flange 18 on the casing, whereby motion is imparted to the latter and thence to the axles by a mechanism which is preferably constructed as follows:—

Mounted on the opposing ends of the axle-sections 11 to turn therewith and contained within the casing 15 in concentric spaced relation thereto are hub members 19, 19 disposed side by side and having keys 20 formed in their bores for engaging corresponding key-ways 21 in the axle-sections. Each hub member is provided at its ends with bearing collars or extensions 22 and journaled on these collars are pairs of roller-retaining rings 23, 24 which are slightly less in diameter than that of the casing and which project a suitable distance beyond the peripheries of their respective hub members, as shown in Figure 2. Interposed between the ends of the axle-sections and extending between the opposing faces of the inner adjoining rings 23, 24 of the hub members is a circular partition plate 25, the latter, the rings and the hub members occupying the space from end to end of the casing 15.

The drive hubs 19 are free to turn independently of the roller-retaining rings 23, 24, the companion rings of a pair being joined at suitable intervals adjacent their peripheries with longitudinal tie rods 26 so that they will move in unison. In their outer edges these rings are provided with a series of longitudinally-alined radial notches or recesses 27 spaced equi-distant apart and the bore of the sleeve-like casing 15 is polygonal in shape, being provided with a plurality of flat sides or bearing faces 28 corresponding in number to the ring-notches, the latter being disposed substantially opposite the intersecting points of such sides, as shown in Figures 3 and 4. Adjoining bearing faces diverge and with the exterior surfaces of the hubs 19 form oppositely converging ways or channels. Operating in the latter and seated in longitudinal grooves or depressions 29 in the peripheries of the respective hub members and fitting at their ends in the retaining ring notches 27 are two annular rows of forward and reverse clutching elements 30, which are preferably in the form of rollers, as shown. It will be noted, as seen in Figures 2 and 4, that the notches 27 are of such a depth that the clutching rollers do not engage their bottoms but seat themselves in the grooves 29, the rollers having a slight clearance laterally in the notches to permit them freedom of movement. Furthermore, the depth of the grooves is such that during a differential action of the drive unit, the clutching rollers of the faster revolving hub are permitted to occupy the enlarged portions or apexes 31 formed by the diverging casing-walls 28 and allow the hubs 19 to freely revolve past them relative to the drive casing.

When the drive casing 15 is turned in one direction by motion imparted to it from the propeller shaft pinion 13 of the vehicle, the clutching rollers are forced in a corresponding direction into gripping or wedging contact with those portions of the flat inner walls 28 of said casing at one side of their apexes 31, while when the casing is turned in the reverse direction, such rollers contact with those portions of the walls on the opposite side of their apexes, whereby the hubs together with their axle-sections 11 are uniformly driven in a forward or reverse direction. During this positive drive action, the clutching rollers remain in their corresponding hub grooves.

In order to normally maintain the hub members 19 and the rollers-retaining rings 23, 24 in their same relative positions, with the ring-notches 27 in line with the hub-grooves 29, a friction element is interposed between each hub member and one of the rings of a pair. As shown in Figure 2, this friction element preferably consists of a ring 32 seated in an annular recess 33 in the hub member and coupled thereto so as to turn therewith by one or more bosses or projections 34 formed on the friction ring and engaging corresponding sockets 35 in the opposing end of the hub member. Coil springs 36 housed in these sockets constantly urge the ring 32 into frictional engagement with the adjoining face of the retaining ring 23. While performing this function, these friction elements permit the necessary relative movement of the hubs and the retaining rings which is occasioned by the differential action of the drive unit.

As heretofore stated, during a differential movement of the axle-sections, as when the vehicle is turning a corner, the clutching rollers of the faster revolving hub members lie in a non-gripping position in the apexes of the casing-walls 28. For the purpose of holding the retaining rings of those rollers in such neutral position relative to its revolving axle-section while the rollers of the companion axle-section are in gripping position, complemental stop elements are provided between the adjoining inner retaining rings 23, 24 of both sets of rollers. Fixed to one of the rings is a pin 37 which extends through alining circumferential slots 38, 39 formed in the adjoining ring and the partition plate 25, respectively. In the normal forward or reverse drive position, the pin is located substantially centrally of the slots, as shown in Figure 3, while during a differential action, the pin engages one end or the other of the slots, as seen in Figure 4, depending on whether the vehicle is traveling forward or backward. In the last-named position, which results from the faster revolving drive-hub moving its clutching rollers into the apexes 31 defined by the casing-walls 28 where they are disposed to allow the hub to turn freely past them, the pin and slot arrangement between the inner retaining rings 23, 24 acts to hold the latter in their proper relative positions to maintain the rollers about the faster revolving hub in their non-gripping or released position.

The partition 25 between the adjoining inner retaining rings 23, 24 serves to prevent longitudinal displacement of the clutching rollers and avoids possible interference of one row of rollers interfering with those in the other row.

I claim as my invention:—

1. A vehicle drive mechanism of the character described, comprising alined axle-sections having hubs on their opposing inner ends, a driving member mounted on the axle-sections and enclosing their hubs in concentric spaced relation thereto, the inner wall of the driving member having a plurality of plane faces thereon, bearing collars formed at the outer and opposing inner ends of said hub members, clutching elements arranged in the spaces between the respective hubs and the driving member for releasable gripping engagement therewith, and retaining rings having peripheral notches for the clutch elements journaled on said bearing collars and jointly constituting a cage for receiving the ends of said clutch elements.

2. A vehicle drive mechanism of the character described, comprising alined axle-sections having hubs on their opposing inner ends, a driving member mounted on the axle-sections and enclosing their hubs in concentric spaced relation thereto, the inner wall of the driving member having a plurality of plane faces thereon, bearing collars formed at the outer and opposing inner ends of said hub members, clutching elements arranged in the spaces between the respective hubs and the driving member for releasable gripping engagement therewith, two pairs of retaining rings for receiving the opposite ends of the clutch elements journaled on said bearing collars, each pair of rings with its clutch elements being independently movable circumferentially relatively to said hubs, said rings having radial notches in their outer edges for receiving the clutching elements, and tie rods disposed between certain of said notches and connecting the rings of a pair as a unit.

3. A vehicle drive mechanism of the character described, comprising alined axle-sections having hubs on their opposing inner ends, a driving member mounted on the axle-sections and enclosing their hubs in concentric spaced relation thereto, the inner wall of the driving member having a plurality of plane faces thereon, bearing collars formed at the ends of said hub members, clutching elements arranged in the spaces between the respective hubs and the driving member for releasable gripping engagement therewith, and pairs of retaining rings, journaled on said bearing collars and extending beyond the peripheries of said hubs, said rings having radial notches therein for receiving the opposite ends of the clutching elements and the peripheries of the hubs having grooves therein in which said elements are adapted to seat.

4. A vehicle drive mechanism of the character described, comprising alined axle-sections having hubs on their opposing inner ends disposed side by side, a driving member mounted on the axle-sections and enclosing their hubs in concentric spaced relation thereto, forward and reverse clutching elements surrounding the hubs for releasable gripping engagement between the latter and the inner wall of the driving member, retaining members for the clutching elements disposed at opposite ends of the hubs and independently movable circumferentially relatively thereto, and means interposed between the opposing faces of the retaining members and said hubs for frictionally holding said members in the same relative positions.

5. A vehicle drive mechanism of the character described, comprising alined axle-sections having hubs on their opposing inner ends, a driving member for the axle-sections enclosing said hubs, forward and reverse clutching elements interposed between the driving member and the hubs for transmitting motion from the former to the latter, retaining members for the respective clutching elements for shifting them in unison to their forward or reverse driving positions, said hubs and said retaining members being movable circumferentially relatively to one another, and means for holding the retaining members and their hubs in the same relative position during the shifting of the elements to one or the other of the aforementioned positions.

6. A vehicle drive mechanism of the character described, comprising alined axle-sections having hubs on their opposing inner ends, a driving member for the axle-sections enclosing said hubs, forward and reverse clutching elements interposed between the driving member and the hubs for transmitting motion from the former to the latter, retaining members for the respective clutching elements disposed at opposite ends of the hubs for shifting the elements in unison to their forward or reverse driving positions, said hubs and said retaining members being movable circumferentially relatively to one another, and friction means interposed between the opposing faces of the hubs and the companion retaining members for holding the latter and the former in the same relative position during the shifting of the elements to one or the other of the aforementioned positions.

7. A vehicle drive mechanism of the character described, comprising alined axle-sections having hubs on their opposing inner ends, a driving member for the axle-sections enclosing said hubs, forward and reverse clutching elements interposed between the driving member and the hubs for transmitting motion from the former to the latter, retaining members for the respective clutching elements disposed at opposite ends of the hubs for shifting the elements in unison to their forward or reverse driving positions, said hubs and said retaining members being movable circumferentially relatively to one another, a friction member interposed between one end of each hub and the companion retaining member and coupled to one of said parts to turn therewith, and means for yieldingly urging said friction member into contact with the other of said parts.

8. A vehicle drive mechanism of the character described, comprising alined axle-sections having hubs on their opposing inner ends disposed side by side, a driving member mounted on the axle-sections and enclosing their hubs in concentric spaced relation thereto, forward and reverse clutching elements surrounding the hubs for releasable gripping engagement between the latter and the inner wall of the driving member, retaining members for the clutching elements disposed at opposite ends of the hubs and independently movable circumferentially relatively thereto, and means acting on one of said retaining members for frictionally holding them in the same relative positions.

MANLY E. KING.